(12) United States Patent
Baek et al.

(10) Patent No.: US 11,543,910 B2
(45) Date of Patent: Jan. 3, 2023

(54) DISPLAY DEVICE WITH OPTICAL ADHESIVE LAYER AND BLOCKING LAYER

(71) Applicant: SAMSUNG DISPLAY CO., LTD., Yongin-si (KR)

(72) Inventors: In-Su Baek, Seoul (KR); Gyun Soo Kim, Daejeon (KR); Min Ki Kim, Hwaseong-si (KR); Ah-Ram Lee, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/036,199

(22) Filed: Sep. 29, 2020

(65) Prior Publication Data

US 2021/0181915 A1    Jun. 17, 2021

(30) Foreign Application Priority Data

Dec. 16, 2019    (KR) .......................... 10-2019-0168243

(51) Int. Cl.
*G06F 3/041* (2006.01)
*B32B 37/12* (2006.01)
*B32B 7/14* (2006.01)

(52) U.S. Cl.
CPC ............ *G06F 3/04164* (2019.05); *B32B 7/14* (2013.01); *B32B 2457/208* (2013.01)

(58) Field of Classification Search
CPC .......... G02F 1/1333; G06F 1/16; G06F 3/041; G06F 3/044; G09G 3/36; B32B 7/12; B32B 7/14; B32B 3/06; B32B 3/30; B32B 37/12; B32B 37/24; B32B 38/00
See application file for complete search history.

(56) References Cited

U.S. PATENT DOCUMENTS

| | | | | |
|---|---|---|---|---|
| 2009/0160819 A1* | 6/2009 | Sasaki | ..................... | G06F 3/047 345/174 |
| 2014/0104507 A1* | 4/2014 | Yamazaki | ........... | G02F 1/13338 349/12 |
| 2015/0070602 A1* | 3/2015 | Fujita | .................. | G02F 1/13338 349/12 |
| 2015/0205022 A1* | 7/2015 | Kim | ........................ | B32B 37/10 156/247 |
| 2015/0208521 A1* | 7/2015 | Seo | ..................... | B32B 37/1284 361/746 |
| 2017/0278897 A1* | 9/2017 | Ao | ......................... | H01L 33/641 |
| 2018/0031903 A1* | 2/2018 | Nagata | ................. | H01L 23/3171 |
| 2019/0137810 A1* | 5/2019 | Yoshida | .................. | B32B 37/12 |
| 2020/0150718 A1* | 5/2020 | Ogura | ............... | G02F 1/133308 |
| 2021/0328177 A1* | 10/2021 | Wang | ..................... | H01L 51/56 |

FOREIGN PATENT DOCUMENTS

| | | |
|---|---|---|
| KR | 10-2010-0082439 | 7/2010 |
| KR | 10-1474988 | 12/2014 |
| KR | 10-2016-0080973 | 7/2016 |
| KR | 10-2019-0075686 | 7/2019 |

\* cited by examiner

*Primary Examiner* — Chanh D Nguyen
*Assistant Examiner* — Nguyen H Truong
(74) *Attorney, Agent, or Firm* — F. Chau & Associate, LLC

(57) ABSTRACT

A display device includes: a display panel; a touch unit that overlaps the display panel; a window that overlaps the display panel and the touch unit; an optical adhesive layer disposed between the touch unit and the window; and a blocking layer disposed between the touch unit and the window and next to the optical adhesive layer. The blocking layer has a thickness that increases with increasing distance from the optical adhesive layer.

14 Claims, 15 Drawing Sheets

DISPLAY DEVICE WITH OPTICAL ADHESIVE LAYER AND BLOCKING LAYER

CROSS-REFERENCE TO RELATED APPLICATION

This application claims priority under 35 U.S.C. § 119 from, and the benefit of, Korean Patent Application No. 10-2019-0168243, filed in the Korean Intellectual Property Office on Dec. 16, 2019, the contents of which are herein incorporated by reference in their entirety.

BACKGROUND

(a) Technical Field

Embodiments of the present disclosure are directed to a display device.

(b) Discussion of the Related Art

In manufacturing a display device, to attach a window that protects a display panel to the display panel, an adhesive layer is formed between the display panel and the window and they are pressed to attach them.

However, an edge portion of the adhesive layer diffuses due to the applied pressure, so that the thickness of the edge portion of the adhesive layer becomes less than the thickness of the other portions, and a gap between the display panel and the window is not uniform, depending on the thickness difference.

As such, when a gap between the display panel and the window is not uniform, display quality degradation can occur.

SUMMARY

Embodiments provide a display device that prevents the edge of an adhesive layer disposed between the display panel and the window from diffusing, thereby maintaining the interval between the display panel and the window.

Embodiments of the present invention are not limited to the above-described object, and may be variously extended without departing from the spirit and scope of embodiments of the present disclosure.

A display device according to an embodiment includes: a display panel; a touch unit that overlaps the display panel; a window that overlaps the display panel and the touch unit; an optical adhesive layer disposed between the touch unit and the window; and a blocking layer disposed between the touch unit and the window and next to the optical adhesive layer.

The blocking layer may have a thickness that increases with increasing distance from the optical adhesive layer.

The blocking layer may have step structure whose thickness increases with increasing distance from the optical adhesive layer.

A part of the blocking layer may overlap the optical adhesive layer.

The part of the blocking layer that overlaps the optical adhesive layer may extend between the optical adhesive layer and the touch unit.

The blocking layer may overlap the edge of the touch unit.

The display device may further include a light blocking film disposed on a surface of the window adjacent to the touch unit, where the light blocking film may be disposed at the edge of the window, and the blocking layer may overlap the light blocking film.

The display device may further include a driving unit connected to the touch unit through a connection part.

The touch unit may include a first edge portion on which the connection part is disposed and a second edge portion on which the blocking layer disposed.

The connection part is not disposed on the second edge portion, and the blocking layer is not disposed on the first edge portion.

A display device according to an embodiment includes: a touch unit; a window that overlaps the touch unit; a driving unit connected to the touch unit through a connection part; an optical adhesive layer disposed between the touch unit and the window; and a blocking layer disposed next to the optical adhesive layer and that overlaps an edge of the touch unit.

The touch unit may include a first edge portion on which the connection part is disposed and a second edge portion on which the blocking layer is disposed.

The blocking layer is not disposed at the first edge portion, and the connection part is not disposed on the second edge portion.

The display device may further include a display panel. The touch unit may overlap the display panel, and the window may overlap the display panel and the touch unit.

According to the embodiments, as an edge of the adhesive layer disposed between the display panel and the window can be prevented from expanding, an interval between the display panel and the window can be kept constant, thereby constantly maintaining the distance between the display panel and the window.

DETAILED DESCRIPTION OF EXEMPLARY EMBODIMENTS

Figure 1:
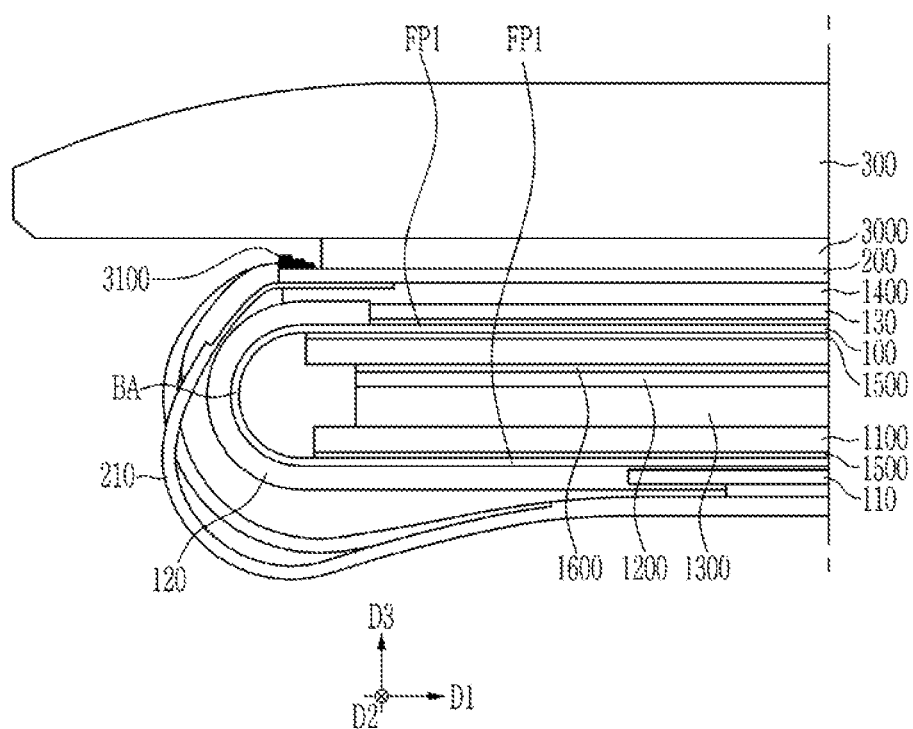
FIG. 1 is a cross-sectional view of a part of a display device according to an embodiment.

Exemplary embodiments of the present disclosure will be described more fully hereinafter with reference to the accompanying drawings, in which exemplary embodiments of the disclosure are shown. As those skilled in the art would realize, exemplary embodiments may be modified in various different ways, all without departing from the spirit or scope of embodiments of the present disclosure.

Like reference numbers may designate like constituent elements through the specification.

In addition, the size and thickness of each configuration shown in the drawings may be arbitrarily shown for better understanding and ease of description. In the drawings, the thickness of layers, films, panels, regions, etc., may be exaggerated for clarity.

It will be understood that when an element such as a layer, film, region, or substrate is referred to as being "on" another element, it can be directly on the other element or intervening elements may also be present.

Next, an exemplary embodiment of the present disclosure is described in detail with reference to accompanying drawings. The same reference numerals may be used for the same components in the drawings, and duplicate descriptions of the same components are omitted.

Figure 2:
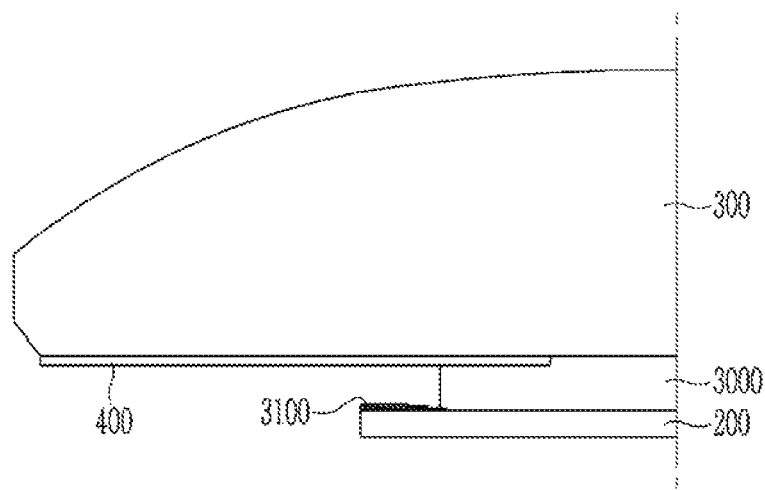
FIG. 2 is a cross-sectional view of a part of a display device of FIG. 1.
Figure 3:
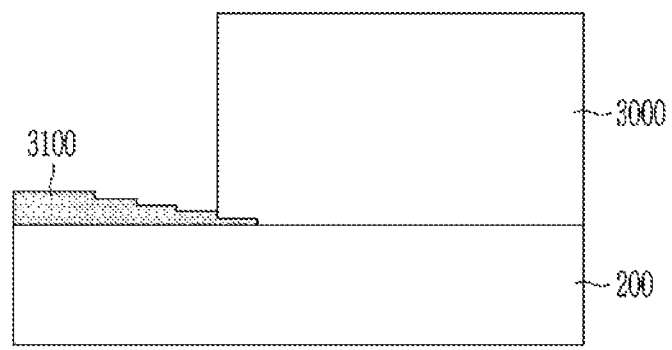
FIG. 3 is a cross-sectional view of a blocking part of a display device according to an embodiment.

A display device according to an embodiment is described with reference to FIG. 1 to FIG. 3. FIG. 1 is a cross-sectional view of a part of a display device according to an embodiment, FIG. 2 is a cross-sectional view of a part of a display device of FIG. 1, and FIG. 3 is a cross-sectional view of a blocking part of a display device according to an embodiment.

First, referring to FIG. 1, a display device 10 according to an embodiment includes a display panel 100 that includes a bent part BA, a touch unit 200 disposed on the display panel 100, and a window 300 disposed on the touch unit 200.

According to an embodiment, the display panel 100 includes the bent part BA, and the display panel 100 includes a first portion FP1 and a second portion FP2 disposed on opposite sides of the bent part BA, facing each other along a third direction D3, and being substantially flat with respect to a plane defined by a first direction D1 and a second direction D2 that crosses the first direction DR1. Note that the third direction DR3 is normal to the plane defined by the first and second directions DR1, DR2. The bent part BA can be bent about a bending axis parallel to the second direction.

According to an embodiment, two flat supporting layers 1100 face each other and overlap the first portion FP1 and the second portion FP2, respectively. Each supporting layer 1100 supports the flat first portion FP1 and second portion FP2 of the display panel 100.

According to an embodiment, a metal layer 1200 and an auxiliary layer 1300 are disposed between the two supporting layers 1100. The auxiliary layer 1300 uniformly maintains the interval between the flat first portion FP1 and the second portion FP2 of the display panel 100, and may adhere the overlying and underlying layers by having adherence.

According to an embodiment, a protection layer 120 is disposed in the bent part BA of the display panel 100, thereby protecting the bent part BA of the display panel 100. A polarization layer 130 is disposed between the display panel 100 and the touch unit 200.

According to an embodiment, a first adhesive layer 1400 is disposed between the polarization layer 130 and the touch unit 200, a second adhesive layer 1500 is disposed between parts of the flat display panel 100 and two supporting layers 1100, and a third adhesive layer 1600 is disposed between the metal layer 1200 and the one of the supporting layers 1100.

According to an embodiment, a display panel driving unit 110 is connected to the display panel 100, and a touch unit driving unit 210 is connected to the touch unit 200.

According to an embodiment, an optically clear adhesive layer 3000 is disposed between the touch unit 200 and the window 300. The optical adhesive layer 3000 is adhesive and has a transmittance of about 90% or more.

According to an embodiment, a blocking layer 3100 is disposed next to the optical adhesive layer 3000 along the first direction D1 and overlaps the edge of the touch unit 200.

According to an embodiment, the blocking layer 3100 prevents the optical adhesive layer 3000 from diffusing toward the edge.

Referring to FIG. 2 and FIG. 3, according to an embodiment, a light blocking film 400 is disposed at the edge of the window 300 of the display device 10, and partially between the window 300 and the optical adhesive layer 3000. The light blocking film 400 is disposed on the edge of the window 300 to prevent light leakage from the edge of the display device 10 and to prevent a peripheral area of the display device 10 from being perceived.

According to an embodiment, the blocking layer 3100 overlaps the light blocking film 400.

According to an embodiment, the blocking layer 3100 becomes with increasing distance from the edge of the optical adhesive layer 3000, and has a step shape.

According to an embodiment shown in FIG. 3, the blocking layer 3100 includes five layers having different heights, however embodiments are not limited thereto, and in other embodiments, the shape of the blocking layer 3100 is different. Part of the blocking layer 3100 overlaps and extends under the edge of the optical adhesive layer 3000. In the blocking layer 3100, the thickness of the part that overlaps the optical adhesive layer 3000 is less than that of other parts, and the thicker parts of the blocking layer 3100 can prevent the optical adhesive layer 3000 from further extending to the blocking layer 3100.

The display device 10 according to an embodiment includes the blocking layer 3100 disposed between the window 300 and the touch unit 200, adjacent to the edge of the optical adhesive layer 3000, and overlapping of the touch unit 200.

According to an embodiment, the blocking layer 3100 is disposed adjacent to the edge of the optical adhesive layer 3000, thereby preventing the edge of the optical adhesive layer 3000 from unnecessarily extending in the step of adhering the window 300 and the step applying external pressure from the outside. As such, by preventing the edge of the optical adhesive layer 3000 from expanding, the thickness of the edge portion of the optical adhesive layer 3000 is prevented from thinning. Accordingly, the distance between the window 300 and the touch unit 200, and the window 300 and the display panel 100, is kept constant.

Figure 4:
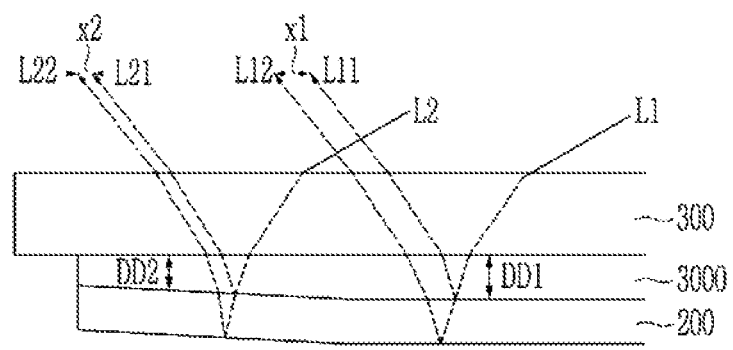
FIG. 4 illustrates a path of light.

Next, according to an embodiment, a path of light between the window 300 and the touch unit 200, and between the window 300 and the display panel 100 under the touch unit 200, is described with reference to FIG. 4. FIG. 4 illustrates a path of light incident on a display device.

Referring to FIG. 4, the thickness of the optical adhesive layer 3000 may vary depending on the position, wherein the center portion has a first thickness DD1 and the edge portion has a second thickness DD2 that is less than the first thickness DD1.

After a first light L1 incident from the outside is refracted by the window 300, the first light L1 is refracted again at a different angle while passing through the optical adhesive layer 3000 having the first thickness DD1, and then a part of the first light L1 is reflected from the surface of the touch unit 200 and exits by a first path L11 through the optical adhesive layer 3000 and the window 300. The remaining part is incident to the touch unit 200 and then is reflected from the surface of the display panel 100 disposed below the touch unit 200 and again exits by a second path L12 through the touch unit 200, the optical adhesive layer 3000, and the window 300. As such, the first light L1 exits along the first path L11 and the second path L12, depending on the incident and reflected layer, and a first path difference x1 occurs between the first path L11 and the second path L12.

A second light L2 incident from the outside has the same initial incident angle as the first light L1, but passes through the optical adhesive layer 3000 having the second thickness DD2. In detail, after the second light L2 incident from the outside is refracted by the window 300, the second light L2 is again refracted at a different angle through the optical adhesive layer 3000 having the second thickness DD2, and then a part of the second light L2 is reflected from the surface of the touch unit 200 and exits by a third path L21 through the optical adhesive layer 3000 and the window 300. The remaining part is incident to the touch unit 200 and then reflected from the surface of the display panel 100 disposed below the touch unit 200 and again exits by a fourth path L22 through the touch unit 200, the optical adhesive layer 3000, and the window 300. As such, the second light L2 exits along the third path L21 and the fourth path L22, depending on the incident and reflected layer, and a second path difference x2 occurs between the third path L21 and the fourth path L22. The second path difference x2 is less than the first path difference x1. Since the second thickness DD2 through which the second light L2 has passed is less than the first thickness DD1 through which the first light L1 has passed, the change of the refractive angle due to the optical adhesive layer 3000 is relatively small, and since the angle between the surface of the optical adhesive layer 3000 and the incident angle of the second light L2 is also increased, the second path difference x2 of the second light L2 differs from the first path difference x1 of the first light L1.

As described above, the path difference of emitted light that was incident from outside of the display device with the same incidence angle and reflected through each layer differs depending on where the light is incident on the display device, and the difference can recognized from the outside of the display device. This degrades the display quality.

However, as described above, the display device 10 according to an embodiment includes the blocking layer 3100 disposed between the window 300 and the touch unit 200, adjacent to the edge of the optical adhesive layer 3000, and overlapping the edge of the touch unit 200.

According to an embodiment, the blocking layer 3100 is disposed adjacent to the edge of the optical adhesive layer 3000, thereby preventing the optical adhesive layer 3000 from unnecessarily expanding in the step of adhering the window 300 and the step of applying external pressure. As such, by preventing the edge of the optical adhesive layer 3000 from expanding, the thickness of the edge portion of the optical adhesive layer 3000 can be maintained constant. Accordingly, the distance between the window 300 and the touch unit 200, and between the window 300 and the display panel 100 is kept constant, and the display quality degradation that may be generated by the path difference of the external light incident on the display device can be prevented.

Figure 5:
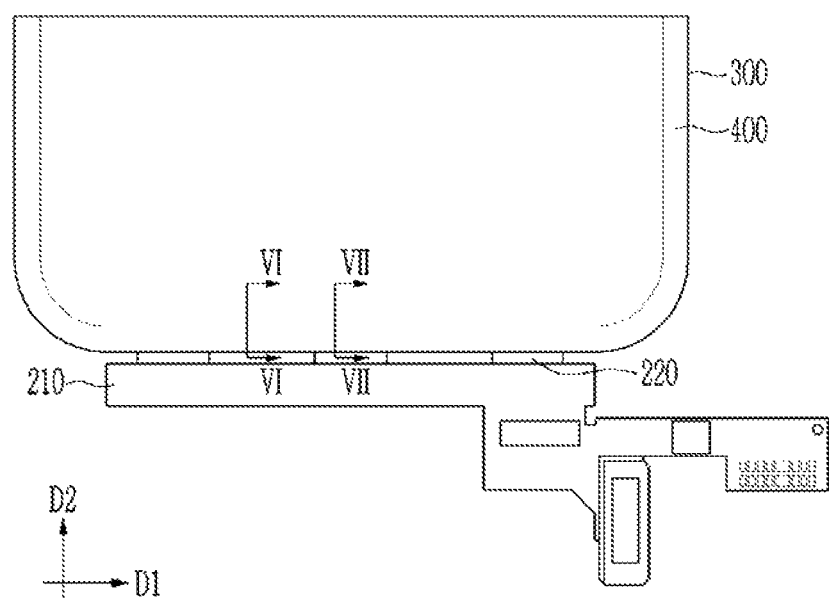
FIG. 5 is a top plan view of a part of a display device according to an embodiment.

Next, a display device according to another embodiment is described with reference to FIG. 5, FIG. 6, and FIG. 7. FIG. 5 is a top plan view of a part of a display device according to an embodiment, FIG. 6 is a cross-sectional view taken along a line VI-VI of FIG. 5, and FIG. 7 is a cross-sectional view taken along a line VII-VII of FIG. 5.

Referring to FIG. 5, according to an embodiment, the light blocking film 400 is disposed at the edge of the window 300 of the display device, the touch unit driving unit 210 connected to the touch unit 200 of the display device is disposed at an edge of the window 300, and a plurality of connection parts 220 are disposed between the touch unit driving unit 210 and the touch unit 200. The touch unit 200 and the touch unit driving unit 210 of the display device are connected to each other through the plurality of connection parts 220.

Figure 6:
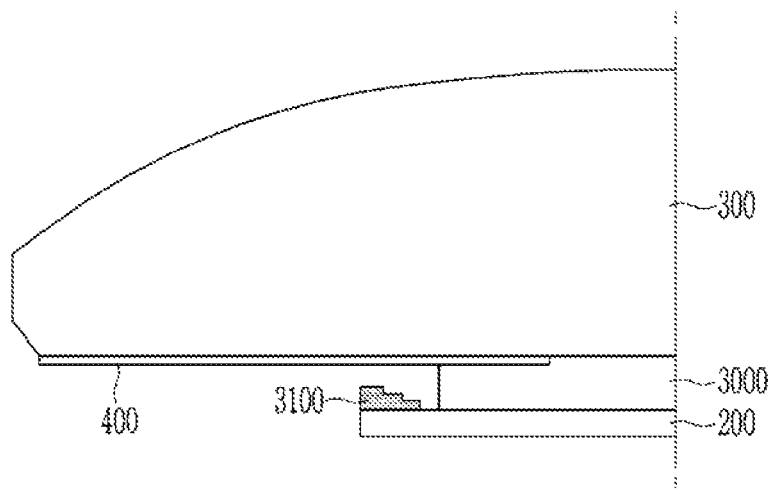
FIG. 6 is a cross-sectional view taken along a line VI-VI of FIG. 5.
Figure 7:
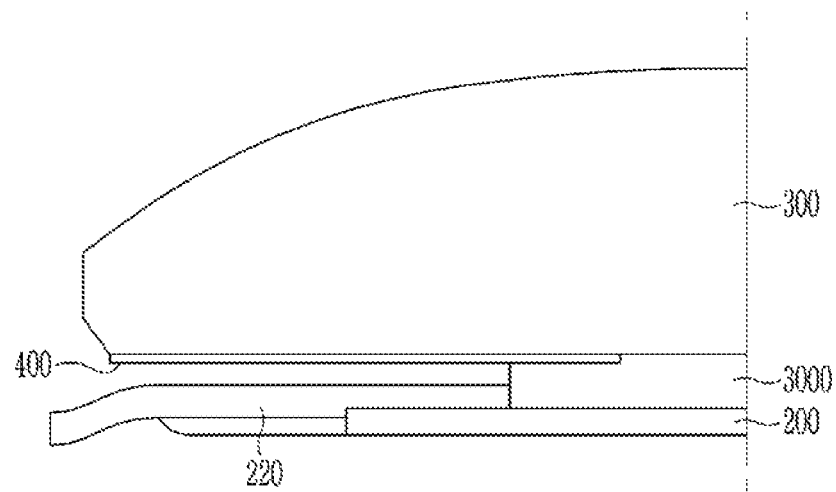
FIG. 7 is a cross-sectional view taken along a line VII-VII of FIG. 5.

Referring to FIG. 6 and FIG. 7, according to an embodiment, the connection parts 220 overlap the edge of the touch unit 200 where the blocking layer is not disposed, and the blocking layer 3100 is disposed on the edge of the touch unit 200 where the connection part 220 is not disposed. The connection part 220 of the touch unit driving unit 210 is disposed at the edge of the touch unit 200, like the blocking layer 3100, and is disposed at the side of the optical adhesive layer 3000, and like the blocking layer 3100, prevents the edge of the optical adhesive layer 3000 from diffusing.

As such, according to an embodiment, the connection part 220 of the touch part driver 210 is attached to a part of the edge of the touch part 200, and the part of the touch part 200 to which the connection part 220 is not attached overlaps the blocking layer 3100. Thus, the optical adhesive layer 3000 disposed between the touch unit 200 and the window 300 can be prevented from diffusing toward the outermost edges of the touch unit 200 and the window 300.

Figure 8:
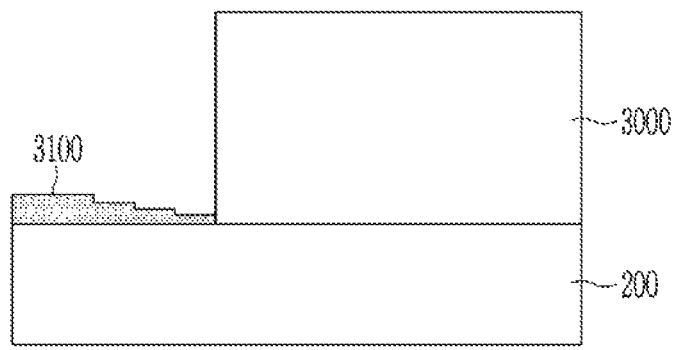
FIG. 8 is a cross-sectional view of a blocking part of a display device according to an embodiment.

The blocking layer 3100 of the display device according to another embodiment is described with reference to FIG. 8. FIG. 8 is a cross-sectional view of a blocking part of a display device according to an embodiment.

Referring to FIG. 8, in a display device according to a present embodiment, the thickness of the blocking layer 3100 gradually increases as the distance from the optical adhesive layer 3000 increases, and has a step shape formed of four layers that gradually increase in thickness. The edge of the blocking layer 3100 is in contact with the edge of the optical adhesive layer 3000. However, the shape of the blocking layer 3100 is formed of a plurality of layers having different thicknesses, and has, for example, a step shape formed of three or more layers.

Figure 9:
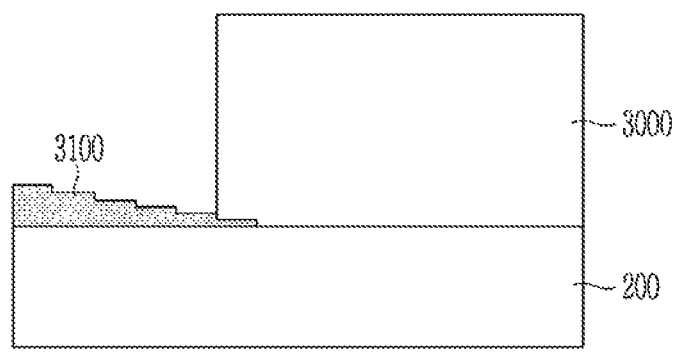
FIG. 9 is a cross-sectional view of a blocking part of a display device according to an embodiment.

Referring to FIG. 9, in a display device according to a present embodiment, the thickness of the blocking layer 3100 gradually increases as the distance from the optical adhesive layer 3000 increases, and has a step shape formed of four layers that gradually increase in thickness. The edge of the blocking layer 3100 overlaps the optical adhesive layer 3000 and extends between the optical adhesive layer 3000 and the touch unit 200. As described above, the thickness of the part of the blocking layer 3100 that overlaps the optical adhesive layer 3000 is less than that of other parts of the blocking layer 3100. and the thicker parts of blocking layer 3100 can prevent the optical adhesive layer 3000 from expanding to the blocking layer 3100. However, embodiments are not limited thereto, and in other embodiments, the shape of the blocking layer 3100 has three or more layers, such as six layers of different thicknesses.

Next, a method of forming the blocking layer is described with reference to FIG. 10 to FIG. 15. FIG. 10 to FIG. 15 illustrate formation steps of a display device according to an embodiment.

Figure 10:
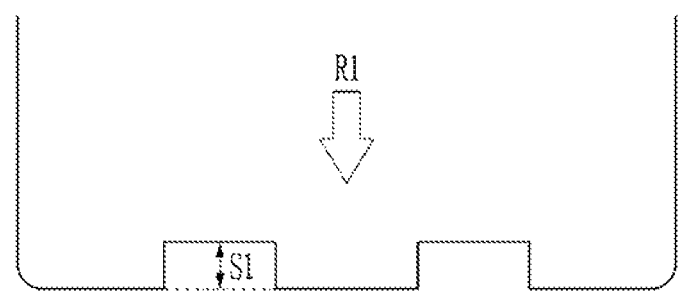
FIG. 10 to FIG. 15 illustrate formation steps of a display device according to an embodiment.
Figure 11:
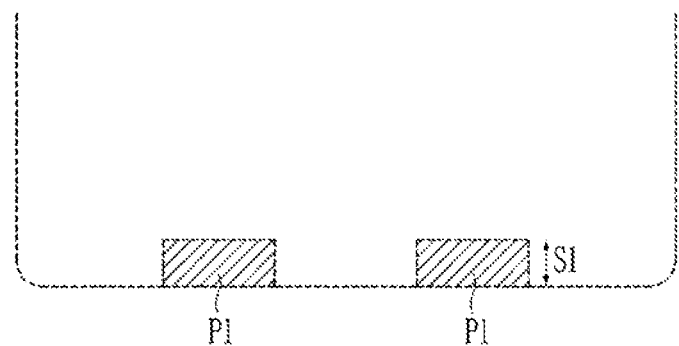

First, according to an embodiment, as shown in FIG. 10 a mask with a first opening of a first width S1 is disposed at a region on the touch unit where the blocking layer will be disposed, and a layer is stacked (R1) on the mask using a roller, etc., to form a first sub-blocking layer P1 at the first opening, as shown in FIG. 11.

Figure 12:
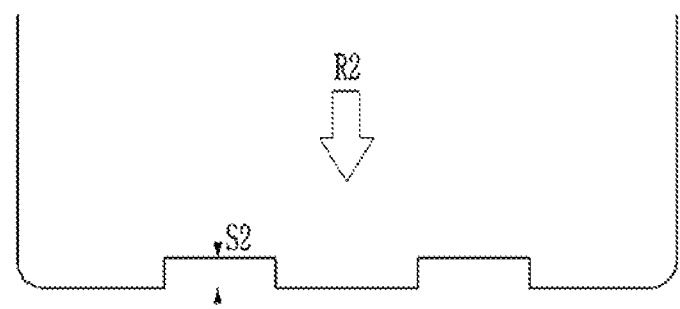
Figure 13:
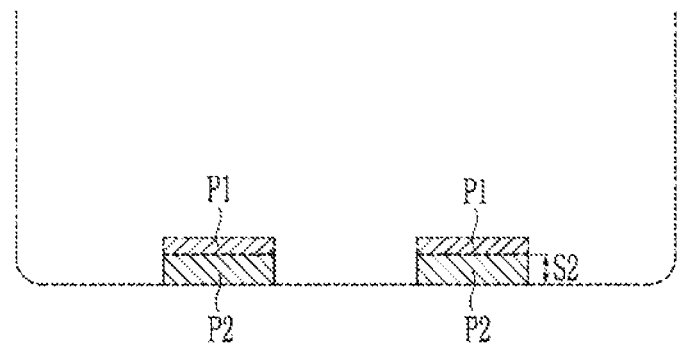

Next, according to an embodiment, as shown in FIG. 12, a blocking film that overlaps the first opening and has a second opening of a second width S2 that is narrower than the first width S1 is used as a mask, and a blocking layer is stacked (R2) on the mask using a roller, etc., to form a second sub-blocking layer P2 disposed at a part of the first sub-blocking layer P1, as shown in FIG. 13. The second sub-blocking layer P2 is disposed at the edge of the first sub-blocking layer P1.

Figure 14:
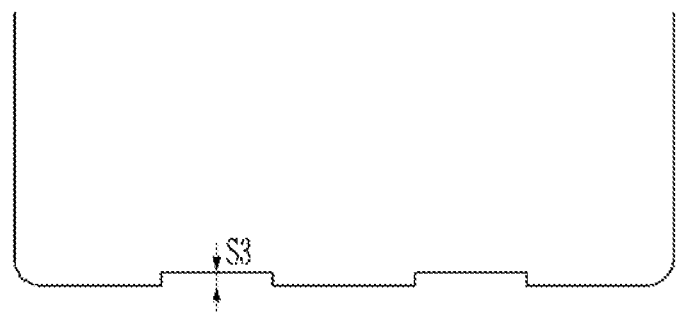
Figure 15:
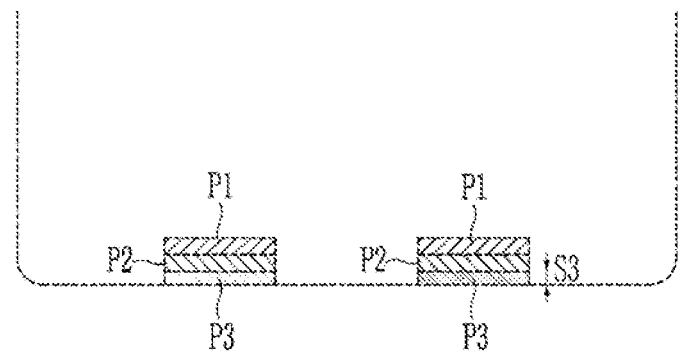

Next, according to an embodiment, as shown in FIG. 14, a blocking film that overlaps the first opening and the second opening and has a third opening of a third width S3 that is narrower than the first width S1 and the second width S2 is used as a mask, and a blocking layer is stacked (R2) on the mask using a roller, etc., a third sub-blocking layer P3 is formed on the part of the first sub-blocking layer P1 and the part of the second sub-blocking layer P2, as shown in FIG. 15. The third sub-blocking layer P3 and the second sub-blocking layer P2 are disposed at the edge of the first sub-blocking layer P1.

As such, according to an embodiment, by forming the second sub-blocking layer P2 on a portion of the first sub-blocking layer P1 and continuously forming the third sub-blocking layer P3 on a portion of the second sub-blocking layer P2, it is possible to form the barrier layer that gradually increases in thickness toward the edges and has a step shape. For example, the thicknesses of the portion where the first sub-blocking layer P1 is disposed, the portion where the first sub-blocking layer P1 and the second sub-blocking layer P2 overlap, and the portion where the first sub-blocking layer P1, the second sub-blocking layer P2, and the third sub-blocking layer P3 overlap, sequentially increase. By adjusting the number, the thickness, and the width of the sub-blocking layer, the final thickness and the width of the blocking layer and the shape of the blocking layer can be adjusted.

As described above, the display device 10 according to an embodiment includes the blocking layer 3100 disposed between the window 300 and the touch unit 200, adjacent to the edge of the optical adhesive layer 3000 and overlapping the edge of the touch unit 200.

According to an embodiment, the blocking layer 3100 is disposed adjacent to the edge of the optical adhesive layer 3000, thereby preventing the edge of the optical adhesive layer 3000 from unnecessarily expanding in a step of adhering the window 300 and a step of applying external pressure from the outside. As such, by preventing the edge of the optical adhesive layer 3000 from expanding, the thickness of the edge portion of the optical adhesive layer 3000 can be maintained constant. Accordingly, the distance between the window 300 and the touch unit 200, and the window 300 and the display panel 100 may be kept constant.

While embodiments of the disclosure have been described in connection with what is presently considered to be exemplary embodiments, it is to be understood that embodiments are not limited to exemplary embodiments. On the contrary, it is intended to cover various modifications and equivalent embodiments included within the spirit and scope of the appended claims.

What is claimed is:

1. A display device, comprising:
  a display panel;
  a touch unit that overlaps the display panel;
  a window that overlaps the display panel and the touch unit;
  an optical adhesive layer disposed between the touch unit and the window;
  a blocking layer disposed between the touch unit and the window and next to and spaced apart from the optical adhesive layer; and
  a light blocking film disposed on a surface of the window adjacent to the touch unit, wherein the light blocking film extends between the window and the optical adhesive layer,
  wherein the blocking layer has step structure whose thickness increases with increasing distance from the optical adhesive layer, and
  wherein the blocking layer overlaps the light blocking film while being spaced apart from the light blocking film.

2. The display device of claim 1, wherein a part of the blocking layer overlaps the optical adhesive layer.

3. The display device of claim 2, wherein the part of the blocking layer that overlaps the optical adhesive layer extends between the optical adhesive layer and the touch unit.

4. The display device of claim 1, wherein the blocking layer overlaps an edge of the touch unit.

5. The display device of claim 1, wherein
  the light blocking film is disposed at an edge of the window.

6. The display device of claim 1, further comprising:
  a driving unit connected to the touch unit through a connection part.

7. The display device of claim 6, wherein the touch unit includes
  a first edge portion on which the connection part is disposed and
  a second edge portion on which the blocking layer disposed.

8. The display device of claim 7, wherein
  the connection part is not disposed on the second edge portion, and
  the blocking layer is not disposed on the first edge portion.

9. A display device comprising;
  a touch unit;
  a window that overlaps the touch Unit;
  a driving unit connected to the touch unit through a plurality of connection parts;
  an optical adhesive layer disposed between the touch unit and the window;
  a light blocking film disposed on a surface of the window adjacent to the touch unit, and
  a blocking layer disposed next to and spaced apart from the optical adhesive layer and that overlaps an edge of the touch unit, wherein the touch unit includes
  a plurality of first edge portions of a first edge in which the plurality of connection parts are disposed and
  a plurality of second edge portions of the first edge in which the blocking layer is disposed,
  wherein the plurality of first edge portions and the plurality of second edge portions are adjacent to and alternate with each other on the first edge,
  the blocking layer is not disposed at the first edge portion of the first edge, and
  the connection part is not disposed on the second edge portion of the first edge,
  wherein the light blocking film extends between the window and the optical adhesive layer,
  wherein the blocking layer overlaps the light blocking film while being spaced apart from the light blocking film.

10. The display device of claim 9, wherein the blocking layer has a thickness that increases with increasing distance from the optical adhesive layer.

11. The display device of claim 10, wherein the blocking layer has step structure whose thickness increases with increasing distance from the optical adhesive layer.

12. The display device of claim 9, wherein a part of the blocking layer overlaps the optical adhesive layer.

13. The display device of claim 12, wherein the part of the blocking layer that overlaps the optical adhesive layer extends between the optical adhesive layer and the touch unit.

14. The display device of claim 9, further comprising:
a display panel, wherein
the touch unit overlaps the display panel, and
the window overlaps the display panel and the touch unit.

* * * * *